Jan. 18, 1949.  J. R. RAFTER  2,459,744
ADHESION OF RUBBER TO MAGNESIUM
Filed Dec. 18, 1944
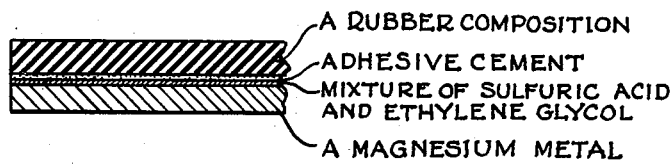
INVENTOR
JOHN R. RAFTER
BY
ATTORNEYS Patented Jan. 18, 1949

2,459,744

UNITED STATES PATENT OFFICE 2,459,744

ADHESION OF RUBBER TO MAGNESIUM

John Richard Rafter, Sharon, Mass., assignor to The Firestone Tire & Rubber Company, Akron, Ohio, a corporation of Ohio Application December 18, 1944, Serial No. 568,791

2 Claims. (Cl. 154—130)

This invention relates to a method of bonding a rubber to magnesium or its alloys.

Heretofore it has been very difficult to bond a rubber to a magnesium metal with a high degree of adhesion. Temporary bonds have been obtained by using thermoplastic adhesive compositions, but these bonds were unsatisfactory at high operating temperatures, and often failed at normal temperatures.

It is an object of the invention to provide a method of producing satisfactory adhesion between a magnesium metal and a rubber. Other objects will become apparent as the description of the invention proceeds, reference being made to the single figure of the accompanying drawing which illustrates a specific aspect of the invention.

It has now been discovered that the surface of a light metal may be made capable of forming a satisfactory bond with a rubber by means of a special pre-treatment. The metal surface is treated with an acidified polyhydric alcohol, and, after it is dried, the metal can be adhered to a rubber by means of a conventional rubber-to-metal adhesive composition or tie-gum.

The metal article employed in the invention includes a surface of a magnesium metal, that is, magnesium or any of the alloys in which it predominates.

A rubber suitable for use in the present process includes natural rubber and the various vulcanizable synthetic rubbers, such as Buna N (copolymer of butadiene and acrylonitrile), Buna S (copolymer of butadiene and styrene), neoprene (polymers and copolymers of 2-chloro-1,3-butadiene), butyl rubber (copolymer of isoprene and isobutylene), and similar vulcanizable rubbers based upon the polymerization of butadiene, its homologs or substitution products, alone or in combination with one or more polymerizable unsaturated compounds.

The composition for treating the surface of the light metal is essentially an acidified polyhydric alcohol. The alcohols contemplated include ethylene glycol, a propylene glycol, a butylene glycol, glycerol, erythritol, sorbitol, diethylene glycol, polyethylene glycols, polyglycerols, and substitution products such as, for example, glycerol monochlorhydrin and glycerol monomethyl ether. The alcohol is acidified by a concentrated sulfuric acid.

In general, any adhesive cement, composition or tie-gum which is capable of producing a strong bond between a rubber and steel may be employed to bond a rubber to the surface of a magnesium metal treated in accordance with this invention. Examples of commercial adhesive cements operative in the present process include chlorinated rubber adhesive cements (e. g., "Ty-Ply R or Q" and "Ty-Ply S" cements marketed by the R. T. Vanderbilt Co.), rubber hydrochloride cements (e. g., "Bondoprene R" and "Bondoprene S" cements marketed by the Marbon Corp.), and various cements based upon a modified rubber, such as "cyclized rubber" or rubber isomers having less unsaturation than unvulcanized rubber (e. g., "Reanite" cements sold by U. S. Stoneware Co.).

The invention is illustrated by the following examples.

Example 1

This example is illustrated by the single figure of the accompanying drawing. A few milliliters of sulfuric acid were added to 200 ml. of ethylene glycol. A strip of magnesium was immersed in the mixture for several days at room temperature. The strip was then removed from the mixture, dried by heating, coated with "Ty-Ply R" cement and dried. A vulcanizable rubber composition was thereafter pressed against the treated magnesium surface and heated in that position under pressure to vulcanize the rubber. The resulting product displayed a high degree of adhesion between the rubber and metal, both at ordinary and elevated temperatures.

Example 2

A strip of magnesium was treated with acidified glycol as in Example 1 and dried by heating. The treated strip was coated with "Ty-Ply S," dried, then coated with "Ty-Ply R" and dried. A rubber composition was vulcanized in pressure contact with the treated metal and found to adhere satisfactorily thereto.

Example 3

A treating bath was prepared by mixing 5 ml. of concentrated sulfuric acid with 500 ml. of ethylene glycol. Strips of a commercial magnesium alloy ("Dowmetal," containing about 85–98% of magnesium, marketed by Dow Chemical Co.) were immersed in the bath for 24 hours. The strips were then removed from the bath, washed with water and baked for 2 hours at 140° C. "Bondoprene R" cement was applied to the strips and allowed to dry. A vulcanizable rubber was vulcanized in contact with the treated strips in a mold. Good adhesion was obtained.

Example 4

Strips of "Dowmetal" were immersed for 24 hours in an acidified ethylene glycol bath of the composition specified in Example 3. The strips were then removed from the bath and immediately baked for 2 hours at 140° C. The baked strips were washed with water and dried by heat. The strips were coated with "Bondoprene R" cement and dried. A rubber composition was vulcanized in pressure contact with the cemented surface and found to be bonded even more firmly than was the case in Example 3.

Example 5

"Dowmetal" strips were treated with an acidified polyhydric alcohol as in Example 4. The dried strips were coated with "Bondoprene S" cement, dried, coated with "Bondoprene R" cement, and dried. The treated magnesium metal strips were vulcanized to rubber, and the resulting bond between the rubber and metal was found to be very strong.

In some cases, especially when the polyhydric alcohol is normally a solid, as sorbitol, some water may be present in the treating bath. Also, the bath temperature may be raised to speed up the reaction with the surface of the magnesium metal. Improved adhesion is obtained if the metal article is merely coated with the acidified polyhydric alcohol and then heated, and thereafter washed and dried before heating with a rubber composition.

Variations in details and proportions may be made in the process of the invention as set out in the foregoing examples without departing from the spirit or scope of the invention, as defined in the appended claims.

What is claimed is:

1. A method of bonding a rubber to a metal selected from the group consisting of magnesium and its alloys, which includes applying a composition consisting essentially of ethylene glycol acidified by a small percentage of concentrated sulfuric acid to a surface of the metal, baking the metal while a portion of the glycol still remains on the metal surface, washing and drying the surface, applying to the dried surface an adhesive composition comprising a rubber derivative selected from the group consisting of chlorinated rubber, rubber hydrochloride and isomerized rubber, and then vulcanizing a rubber in contact with the treated metal surface.

2. A method of bonding a rubber to a metal selected from the group consisting of magnesium and its alloys, which includes applying a composition consisting essentially of a polyhydric alcohol acidified by a small percentage of concentrated sulfuric acid to a surface of the metal, baking the metal while a portion of the polyhydric alcohol still remains on the metal surface, applying to the baked surface an adhesive composition comprising a rubber derivative selected from the group consisting of chlorinated rubber, rubber hydrochloride and isomerized rubber, and then vulcanizing a rubber in contact with the treated metal surface.

JOHN RICHARD RAFTER.

REFERENCES CITED

The following references are of record in the file of this patent:

UNITED STATES PATENTS

| Number | Name | Date |
|---|---|---|
| 1,011,203 | Jahn | Dec. 12, 1911 |
| 1,677,360 | Merrill | July 17, 1928 |
| 1,926,524 | Gabor | Sept. 12, 1933 |
| 2,147,620 | Winkelmann et al. | Feb. 14, 1939 |
| 2,165,818 | Scholl | July 11, 1939 |